US012774612B1

(12) United States Patent
Love

(10) Patent No.: US 12,774,612 B1
(45) Date of Patent: Oct. 27, 2026

(54) BUOYANT POWER HUB SYSTEM INCLUDING DECORATIVE LIGHTING AND OTHER ACCESSORIES

(71) Applicant: Michael Love, North Palm Beach, FL (US)

(72) Inventor: Michael Love, North Palm Beach, FL (US)

( * ) Notice: Subject to any disclaimer, the term of this patent is extended or adjusted under 35 U.S.C. 154(b) by 0 days.

(21) Appl. No.: 19/188,283

(22) Filed: Apr. 24, 2025

(51) Int. Cl.

| | |
|---|---|
| ***E04H 4/14*** | (2006.01) |
| ***B63B 21/16*** | (2006.01) |
| ***B63B 21/50*** | (2006.01) |
| ***F21S 9/03*** | (2006.01) |
| ***F21V 23/04*** | (2006.01) |
| ***F21V 23/06*** | (2006.01) |
| ***F21V 27/00*** | (2006.01) |

(Continued)

(52) U.S. Cl.
CPC ............. *E04H 4/148* (2013.01); *B63B 21/16* (2013.01); *B63B 21/50* (2013.01); *F21S 9/037* (2013.01); *F21V 23/0435* (2013.01); *F21V 23/0464* (2013.01); *F21V 23/06* (2013.01); *F21V 27/00* (2013.01); *F21V 31/005* (2013.01); *F21S 2/005* (2013.01)

(58) Field of Classification Search
CPC ......... E04H 1/148; B63B 21/16; B63B 21/50; F21S 9/037; F21V 23/0435; F21V 23/0464; F21V 23/06
See application file for complete search history.

(56) References Cited

U.S. PATENT DOCUMENTS 5,369,796 A * 11/1994 Kung ...................... H04B 1/08 441/32
7,089,876 B2 8/2006 Porat
9,404,677 B2 8/2016 Sankrithi
(Continued)

FOREIGN PATENT DOCUMENTS

CN 203771173 U 8/2014
CN 206951473 U 2/2018
(Continued)

OTHER PUBLICATIONS

Machine translation of CN211076268 (Year: 2020).*
(Continued)

*Primary Examiner* — Leah Macchiarolo
(74) *Attorney, Agent, or Firm* — Fox Rothschild LLP

(57) ABSTRACT

A modular buoyant power hub system is disclosed for use on bodies of water such as pools, lakes, and ponds. The system comprises a floating housing with an integrated power source, including either a solar panel with rechargeable batteries or a watertight AC power cord. A plurality of watertight electrical connectors are disposed on the housing, allowing for the connection of various floating or submerged accessories such as decorative lighting, fog machines, water guns, speakers, and pumps. Accessories may be connected in a daisy-chain configuration using compatible watertight connectors. The system optionally includes a retractable anchor line mechanism, built-in lighting, a photocell, a programmable timer or clock, and wireless control via remote or mobile device app. The invention provides a versatile, safe, and aesthetically pleasing solution for powering water-based lighting and entertainment systems.

19 Claims, 10 Drawing Sheets

(51) Int. Cl.
*F21V 31/00* (2006.01)
*F21S 2/00* (2016.01)

(56) References Cited

U.S. PATENT DOCUMENTS

| | | | | |
|---|---|---|---|---|
| 9,502,907 | B2 | 11/2016 | Potucek et al. | |
| 9,951,940 | B2 | 4/2018 | Hui et al. | |
| 10,038,400 | B2 | 7/2018 | Kim | |
| 10,079,504 | B2 | 9/2018 | Hui et al. | |
| 11,958,569 | B2 | 4/2024 | Sakaguchi et al. | |
| 12,184,221 | B2 | 12/2024 | Mayer et al. | |
| 2002/0157299 | A1 | 10/2002 | Barrett | |
| 2002/0179728 | A1 | 12/2002 | Beidokhti | |
| 2004/0092181 | A1* | 5/2004 | Porat | B63B 22/24 441/136 |
| 2007/0230161 | A1 | 10/2007 | Longoria et al. | |
| 2007/0234945 | A1 | 10/2007 | Khouri et al. | |
| 2010/0307566 | A1 | 12/2010 | Hinderling | |
| 2012/0112666 | A1 | 5/2012 | Bennette et al. | |
| 2015/0346726 | A1* | 12/2015 | Davoodi | B63B 22/20 440/38 |
| 2018/0099734 | A1* | 4/2018 | Schibli | B63H 21/21 |
| 2022/0393389 | A1 | 12/2022 | Deloche et al. | |
| 2024/0102305 | A1 | 3/2024 | Potucek et al. | |

FOREIGN PATENT DOCUMENTS

| | | | | |
|---|---|---|---|---|
| CN | 211076268 | * | 7/2020 | |
| WO | WO2023061600 | | 4/2023 | |
| WO | WO-2023061600 A1 | * | 4/2023 | B63B 7/085 |

OTHER PUBLICATIONS

International Search Report and Written Opinion, mailed Sep. 3, 2026, for International Application No. PCT/US2026/025223, 22 pages.

* cited by examiner

BUOYANT POWER HUB SYSTEM INCLUDING DECORATIVE LIGHTING AND OTHER ACCESSORIES

BACKGROUND OF THE INVENTION

The present invention relates to systems for providing a floating power hub system that is used to power various accessories, including decorative lighting, particularly buoyant and non-buoyant decorative lighting that may be used on bodies of water, such as pools, ponds, lakes and the like.

It is becoming commonplace for homeowners to install decorative lighting around their homes and property to create a pleasing and desirable ambiance in the evenings. There are many types of low-voltage lighting systems on the market today that are installed around homes and properties for not only aesthetic purposes, but also for safety, crime deterrence, and for various other reasons. Holiday-themed lighting has become a huge business in the United States, including many types of lighted decorations temporarily installed for the Christmas season, Halloween, and the like.

Additionally, for homeowners who live on bodies of water, such as ponds, lakes, rivers and in coastal locations, there are a variety of different types of lights and systems for use on and around docks, waterfront paths, trails, footbridges, etc. Further, it has been common practice for many years to include underwater lighting in swimming pools, hot tubs, and the like. One popular form of dock lighting includes solar lights that are affixed to the dock, and include a solar panel on an upper surface that is operatively connected to rechargeable batteries, along with photosensors and lights that activate when ambient light reaches a low level around dusk, or shortly thereafter.

More recently, some buoyant lights have been developed, both for decorative purposes, as well as for use in nighttime activities, such as fishing. Underwater lights are also commonly used in ponds, lakes and in coastal areas for fishing activities, as light tends to attract fish.

Buoyant decorative lighting that exists today typically includes a buoyant main body member that includes a solar panel, a battery, a photocell and a light, similarly to the dock lights described above. These types of decorative lighting units may take many forms, including decorative floating balls having LED lights attached thereto, either inside the main body member to create a glowing effect, or attached to an outer portion thereof.

One issue with many of these types of solar lights is that after the lights are activated at night, they tend to become dimmer after a few hours and ultimately turn off well before dawn. One reason for this problem is that the solar cells and internal batteries tend to be small, and cannot provide enough charging capacity to the batteries to fully illuminate the lights overnight.

Low-voltage lighting systems overcome that issue, as the constant power source allows them to remain illuminated overnight, but very few types of decorative low-voltage power systems have been developed for use with decorative lighting accessories designed to float on the surface of a body of water. Some of the problems with providing a plug-in type of decorative light system are associated with providing electrical power and connections to floating objects, as electrical components and connections must include watertight connections, and water tends to corrode electrical systems over time.

Thus, it would be desirable to provide a buoyant power hub system that includes water-resistant or waterproof electrical connections, so that various types of buoyant lights and other electrical accessories may be operatively and electrically connected to and powered by the buoyant power hub. A buoyant power hub, capable of providing enough electrical power to provide lighting overnight, for example, allows for a variety of different types of decorative lights to be displayed, wherein both the power hub and the decorative lighting connected thereto may float on a body of water. Additionally, other types of water-resistant or waterproof lighting may be submerged, in order to provide underwater lighting, and these underwater lights may be connected to and powered by the buoyant power hub, as well. A buoyant power hub is extremely versatile, as it may be used to connect and provide electrical power for decorative lighting, holiday-themed lighting, and for various water activities, such as games and fishing. Further, other types of accessories may be connected to the buoyant power hub, including water fountain accessories that provide a decorative effect, fog/mist creating machines, as well as water-related toys, such as water guns and the like.

Different types of buoyant power hubs have been developed for various purposes, and the following documents provide examples of those efforts. The documents identified and described below are hereby incorporated herein by reference, in their entireties:

U.S. Pat. No. 7,089,876: Floating Electronic Platform for Swimming Pools and Spas A stable, manually portable floating electronic platform for use in pools and spas is equipped with recesses for receiving beverage containers and is equipped with any of a variety of electronic audio/visual equipment devices that are powered by an on-board battery, or a remote rechargeable battery or a conventional remote low-voltage power supply unit via a power cable. Solar power collector panels on the platform (56) References Cited provide a recharging current to on-board or remote batteries via a power cable.

U.S. Pat. No. 9,404,677: Inflatable Linear Heliostatic Concentrating Solar Module Increased utilization of solar power is highly desirable as solar power is a readily available renewable resource with power potential far exceeding total global needs; and as a solar power does not contribute to pollutants associated with fossil fuel power, such as unburned hydrocarbons, NOx and carbon dioxide. The present invention provides low-cost inflatable heliostatic solar power collectors, which a range of embodiments suitable for flexible utilization in small, medium, or utility scale applications. The inflatable heliostatic power collectors use a reflective surface or membrane "sandwiched" between two inflated chambers, and attached solar power receivers which are of concentrating photovoltaic and optionally also concentrating solar thermal types. Floating embodiments are described for certain beneficial applications on. Modest concentration ratios enable benefits in both reduced cost and increased conversion efficiency, relative to simple prior-art flat plate solar collectors.

U.S. Pat. No. 9,502,907: Power Supplies for Pool and Spa Equipment

Power Supplies for pool and spa equipment are disclosed. In one embodiment, the power Supply includes a buoyant housing, a peripheral float, at least one Solar cell positioned on the buoyant housing for collecting Sunlight and converting same to electrical energy, and a power cable for interconnecting the power Supply and pool/spa equipment. In other embodiments, first and second inductive power couplings are provided for powering pool and spa equipment. The power couplings can also be installed using existing plumbing features of the pool or spa.

U.S. Pat. No. 9,951,940: Floating Illumination Device for a Swimming Pool or Other Body of Water and Method Mentioned Therefor A floating illumination device for a water feature has a housing having a sub-housing extending down from a bottom section of the housing. A lighting circuit is held by the sub-housing. A plurality of illuminating elements of the lighting circuit is attached to an outer perimeter of the sub-housing. A cover is positioned over the sub-housing forming a watertight seal.

U.S. Pat. No. 10,038,400: Floating Structures for Floating Photovoltaic System and Method for Connecting Floating Structures Floating structures for a floating photovoltaic system fixed to fixing blocks or fixing means fixed to the bottom of water, each floating structure having one or a plurality of solar modules disposed thereon, the floating structures comprising: a plurality of ropes or a plurality of connection members having fixing hooks for connecting the floating structures with each other so as to restrain the movements of the floating structures, and connecting and fixing parts disposed below the surface of water under the floating structures in such a manner as to be connected to the ropes or the connection members having the fixing hooks, whereby the ropes or the connection members having the fixing hooks are located below the surface of water to restrain the movements of the floating structures.

U.S. Pat. No. 10,079,504: Floating Power Supply for a Body of Water and Method Therefor A floating power supply for a body of water has a flotation unit. A power supply circuit housed within the flotation unit, wherein the power supply circuit provides power to a device within the body of water while untethered to a power source external of the body of water.

U.S. Pat. No. 11,958,569: Float Assembly

An object of the present invention is to provide a float assembly that can prevent the floats from flipping. The present invention provides a float assembly including a plurality of floats connected together comprising: a filled float having a hollow portion, wherein the hollow portion has a part filled with a filler, and the filled float is arranged at a position facing an assembly periphery surrounding the float assembly.

U.S. Pat. No. 12,184,221: Floating Solar Photovoltaic Array with On-Board Energy Management System for Controlling and Powering Inflatable Support Pontoons, Water Quality, Air Compression and Mooring Devices A system for controlling the position and orientation of a floating solar array, having: (a) a floating solar array; (b) a plurality of retractable, bi-directional thrusters mounted to the floating solar array and extending below the floating solar array; (c) a control system on the floating solar array for controlling power level of each of the plurality of thrusters, and (d) a power cable connecting the floating solar array to an onshore grid by way of a power cable connector at a bottom central location on the floating solar array. Submerged baffles, perimeter floats and a method of stowing the floating solar array in high winds by rotating the floating solar array into a direction perpendicular to the direction of the high winds are also included.

US Pat. App. Pub. No. US 2007/0230161: Method and System for Underwater Light Display An underwater light display system for providing a decorative light display on the Surface of a container holding a body of water and/or objects located within a body of water is provided. An exemplary system comprises a shell and a light assembly. The shell comprises a bottom and a top portion. In accordance with an exemplary embodiment, the light assembly is preprogrammed to produce variable light patterns and is secured to the interior Surface of the top portion so as to direct light downward. In accordance with an exemplary embodiment, the light assembly may further comprise a plurality of lenses configured to direct light. In accordance with an exemplary embodiment, the light assembly further comprises a weight having a lens configured to direct light.

US Pat. App. Pub No. US 2007/0234945: Photovoltaic Flotation Device

A device and system for generating electricity with a photovoltaic floatation device is provided. The device comprises one or more photovoltaic cells, which are attached to a panel that is removably attached to a floatation element. The device allows users to utilize the surface areas of water for placement of photovoltaic cells. Multiple devices can be mechanically connected to allow for the formation of one or more photovoltaic floatation device grids. The system comprises one or more photovoltaic floatation devices that are anchored to a particular area in a body of water and are electrically connected to one or more inverters.

US Pat. App. Pub. No. 2010/0307566: Photovoltaic Solar Island

A man-made island, adaptable for land-based or sea-based operation, holds an array of photovoltaic solar collectors aligned with an array of linear Fresnel lenses, which concentrate solar radiation on the photovoltaic solar collectors. The island is rotatable to optimize the angular orientation thereof relative to the position of the sun. More particularly, the man-made island uses a platform that includes a large outer ring that floats on a fluid, and flexible cover attached to the ring to define an airtight volume below the cover. A plurality of rows of supports are located above the cover, and carry the photovoltaic panels. A compressor or blower creates an over-pressure within the enclosed volume to assist in supporting the cover and the other components mounted there above. The supports use brackets to mount the photovoltaic panels in optimum orientation relative to the lenses, and also support cooling device, such as fins or a heat exchanger, or a fiber-laden conduit, thereby to cool the corresponding photovoltaic panels and to optimize efficiency.

US Pat. App. Pub. No. 2022/0393389: Electrical Connectors Configured for Positioning on, at, in, or Near Bodies of Automatic Swimming Pool Cleaners Electrical connectors for automatic swimming pool cleaners (APCs) are described. The connectors may be positioned on, at, in, or near bodies of the APCs and configured to be submerged in water of swimming pools. They additionally may be designed to withstand mechanical pulling stresses when their associated electrical cables are pulled by users to remove APCs from the pools. If such a connector is separable, essentially from the entirety of the electrical cable may be separated from the APC for purposes of untangling or storing the cable, as examples. The separation additionally may allow for insertion of one or more extension cables as needed or desired.

US Pat. App. Pub. No. 2024/0102305 A1: Power Supplies for Pool and Spa Equipment Power supplies for pool and spa equipment are disclosed. In one embodiment, the power supply includes a buoyant housing, a peripheral float, at least one solar cell positioned on the buoyant housing for collecting sunlight and converting same to electrical energy, and a power cable for interconnecting the power supply and pool/spa equipment. In other embodiments, first and second inductive power couplings are provided for powering pool and spa equipment. The power couplings can also be installed using existing plumbing features of the pool or spa.

International Pub. No. WO 2023/061600: Floating Assembly for Generating Solar Power and Method for Installing it A floating assembly for generating solar power, comprising at least one floating element with one or more solar panels resting on top of each element and with mooring lines extending between each element and a fixed mooring arrangement. The mooring arrangement comprises at least one assembly of two buoys which are intended to be anchored by means of anchor lines. At least one string line is provided extending between the two buoys. The at least one string line is located below the water surface and the mooring lines of each element extend between said element and the at least one string line.

SUMMARY OF THE INVENTION

In one embodiment, the present buoyant decorative lighting system includes a buoyant power hub that includes a series of watertight electrical connectors, and preferably includes an anchor line attached thereto for securing the buoyant power hub in place while floating in a body of water. In one preferred embodiment, the anchor line is attached to a spring-loaded reel on an underside of the buoyant power hub, so that the anchor line may be retracted into the buoyant power hub housing when not in use, and may be extended outwardly to any desired length by unwinding the spring-loaded reel within the housing.

Decorative lighting accessories are attachable to the buoyant power hub via an electrical cord that may be operatively connected to the electrical connectors in a watertight fashion, so that the buoyant power hub provides electrical power to the lighting accessories. The decorative lighting accessories may include buoyant lighting accessories, as well as non-buoyant lighting that may be submerged to provide underwater lighting, as desired.

In some embodiments, the decorative lighting accessories may include multiple watertight electrical connectors, so that decorative lighting accessories may be connected in a daisy-chain manner. For example, such lighting accessories may include multiple accessories such as a series of reindeer and a Santa sleigh, wherein the front reindeer, Rudolph, includes a watertight electrical connector on a front end thereof, as well as a rear end thereof. In this way, a series of lighted, buoyant reindeer decorations and a sleigh may all be connected together in line, so that each reindeer may be connected to the one in front and the one behind in a daisy chain manner behind Rudolph, which is connected to the buoyant power hub. In this embodiment, the watertight electrical connector on the front end of the decorative lighting accessory is electrically connected to the watertight electrical connector on the rear end thereof, so that all of the reindeer and the sleigh may be electrically powered by the buoyant power hub.

The buoyant power hub may include a solar panel on an upper portion thereof, which is operatively connected to rechargeable batteries contained within the buoyant power hub, so that the solar panel recharges the batteries during daylight hours. Alternatively, the power hub may include a watertight power cord that may be plugged into a standard electrical outlet. The buoyant power hub may also include a photocell that is used to actuate the lights at night, and shuts down power to the lights during daylight hours. The buoyant power hub, in some embodiments, may include a clock or timer, so that a user may set the time for the lights to come on, and further, may set the time for the lights to turn off. Additionally, the buoyant power hub may be operated by any suitable type of remote control, including a dedicated remote control unit, or via an app on a smartphone, electronic tablet, or any other suitable device that may run a software application (an "app") to control the buoyant power hub and decorative lighting system.

Other types of accessories may be electrically connected to the buoyant power hub, as well, including water fountains, air or water pumps, electrically operated water guns, floating music speakers, or any other desirable electrical device that may be adapted or manufactured to connect to the watertight electrical connectors on the buoyant power hub.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

I. Overview

The present invention is directed to a buoyant power hub system that may be electrically connected to a variety of electrically powered accessories, particularly including buoyant and non-buoyant lighting, toys and games, electrically powered holiday lighting accessories, and the like. The buoyant power hub, in a preferred embodiment, includes multiple watertight electrical connections (also referred to herein as "power points") that connect to power cords in a watertight fashion, wherein the opposed ends of the power cords are attached to various electrically powered accessories for use in bodies of water, such as swimming pools, lakes, ponds, rivers, etc.

II. Buoyant Power Hub

Figure 1:
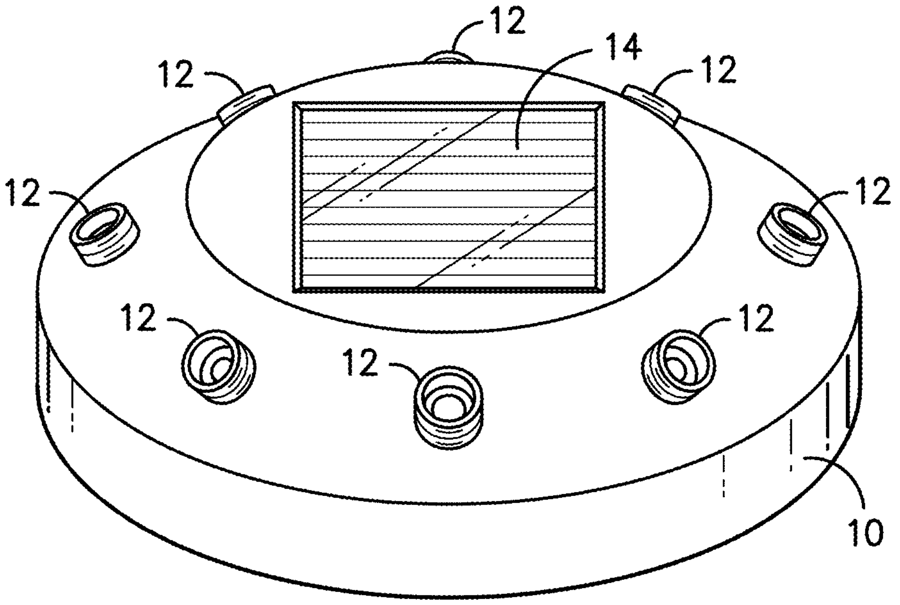
FIG. 1 is a perspective view of one embodiment of a buoyant power hub system, showing a floating housing with a plurality of watertight electrical connectors and a solar panel disposed on an upper surface thereof.
Figure 2:
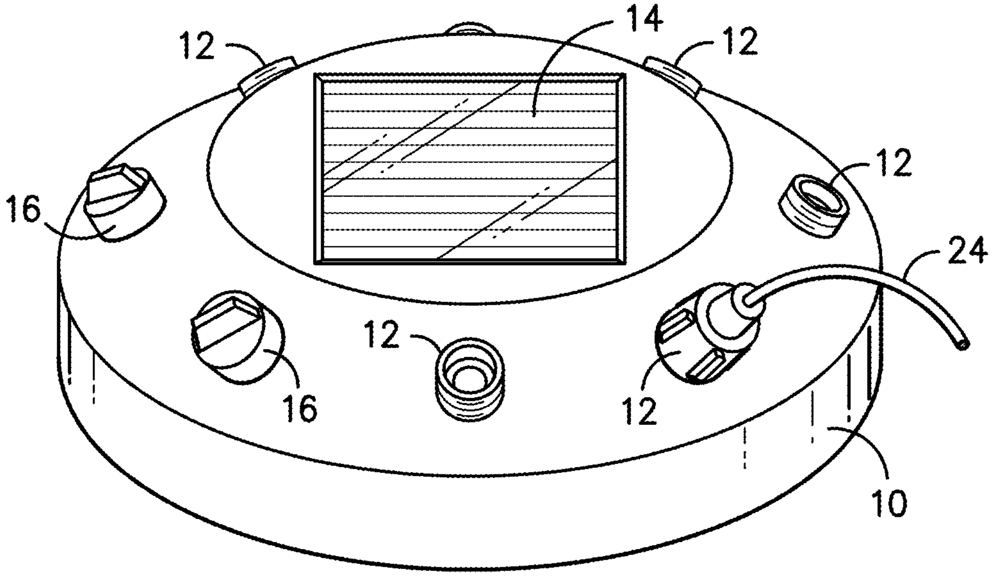
FIG. 2 is a perspective view of another embodiment of the buoyant power hub system, showing a floating housing with multiple watertight electrical connectors and a solar panel on an upper surface, wherein one of the watertight electrical connectors is operatively connected to an electrical cord used to supply power to an external accessory.

Referring now to FIG. 1, the buoyant power hub system includes a floating housing 10 with a solar panel 14 disposed on an upper surface thereof. A plurality of watertight electrical connectors 12 are spaced around the housing perimeter, each with an associated protective cap 16. As shown in FIG. 2, one of the watertight electrical connectors 12 is operatively connected to an electrical cord 24, which may be used to power various accessories, such as buoyant decorative lights, underwater lighting units, or other electrical devices. The solar panel 12 is positioned on the upper surface of the housing 10, and is operatively connected to internal rechargeable batteries housed within the unit, allowing the hub to supply power to attached devices even after sunset.

Figure 3:
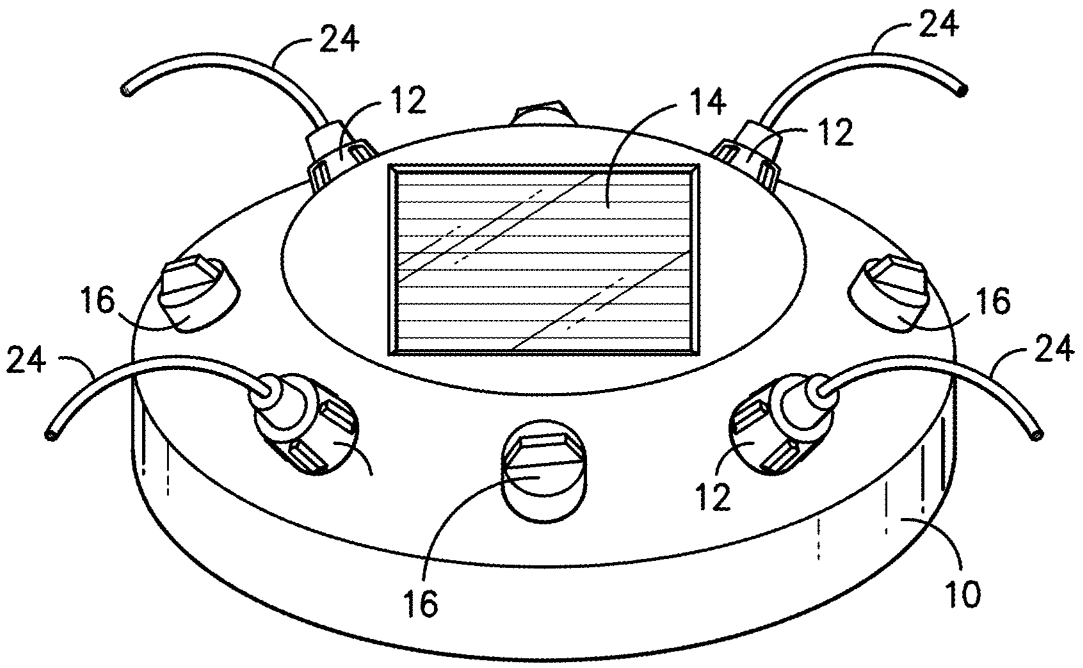
FIG. 3 is a perspective view of one embodiment of a buoyant power hub system illustrating multiple electrical cords operatively connected to watertight electrical connectors, with unused connectors covered by watertight protective caps 16.

As further shown in FIG. 3, multiple electrical cords 24 are operatively connected to corresponding watertight electrical connectors 12 on the buoyant housing 10. The remaining unused watertight connectors are covered with protective caps 16 to maintain a watertight seal and protect the inner electrical contacts from exposure to water. This configuration demonstrates the modular nature of the system, allowing various lighting or accessory devices to be simultaneously connected and powered by the buoyant power hub.

The buoyant power hub preferably serves as a power source for electrically powered accessories that are designed for use in an aquatic environment. The power hub may be made buoyant in any desired manner. In some embodiments, by way of non-limiting examples, the power hub may include an inflatable portion to provide floatation, or may include buoyant materials, such as Styrofoam, cork, or other suitable buoyant materials, and/or may simply be manufactured in a watertight manner so that the buoyant power hub remains buoyant due to having an overall density that is less than that of water.

The buoyant power hub may include a variety of built-in features and components, including an anchor system with wind-up reel 40, one or more speakers, a fogger/mist creating machine, lighting, a transmitter/receiver for communicating wirelessly with other devices, specifically including suitable remote control devices as described herein.

a. Anchor System

In a preferred embodiment, the buoyant power hub 10 includes a means for anchoring itself to the bottom of a body of water. The anchor means may take any suitable form, but in a preferred embodiment, the power hub includes an internal housing having spring-loaded reel 40 with an anchor line 42 wound therearound, so that a user may simply pull the anchor line 42 outwardly from the housing 10 to any desired length.

Figure 6:
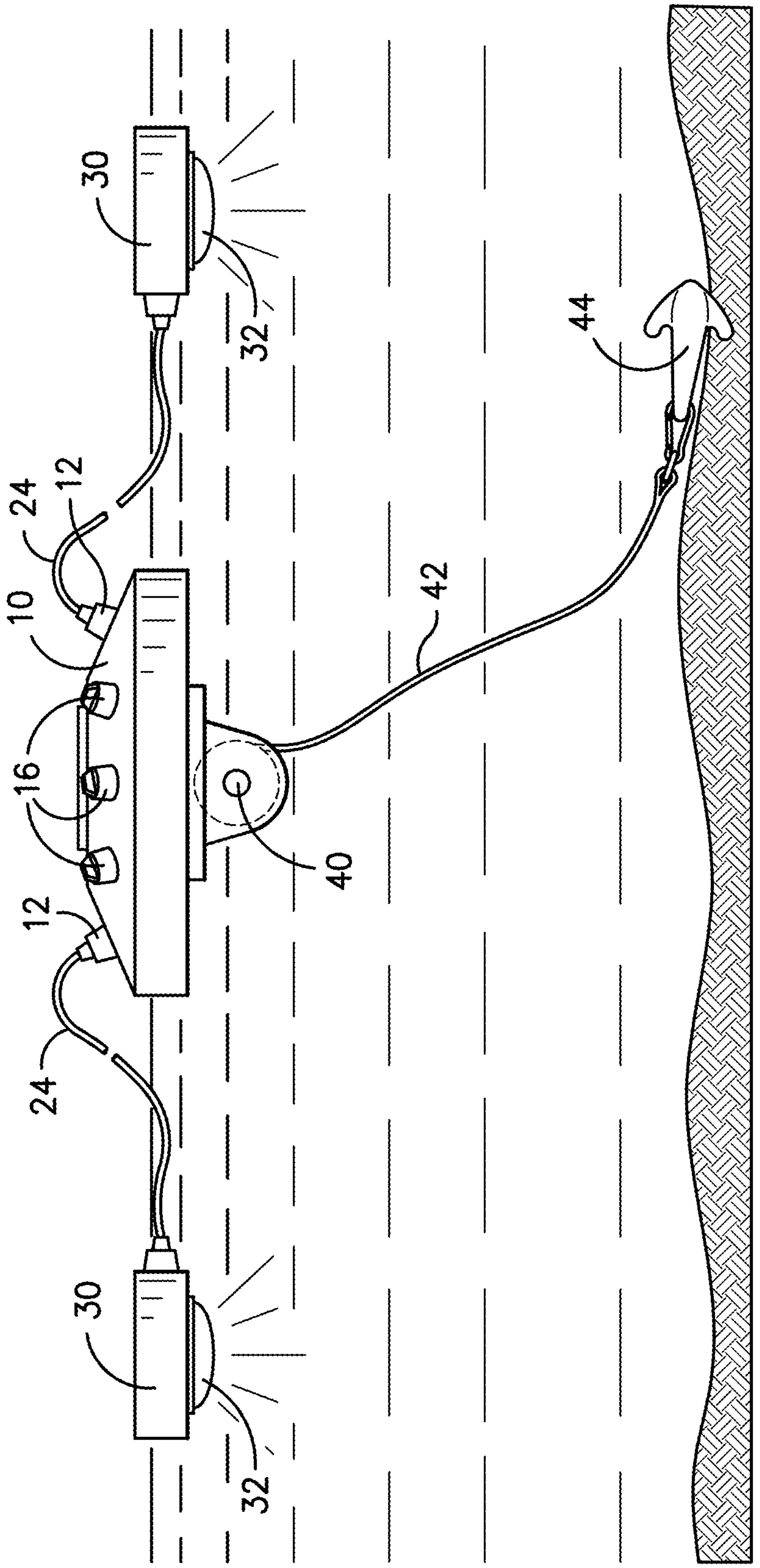
FIG. 6 is a side view of another embodiment of the buoyant power hub system floating on water, including a retractable anchor line reel disposed in a housing on the underside of the power hub. The anchor line is shown extended downwardly and connected to an anchor resting on the bottom of the water body. A pair of buoyant lighting accessories with downward-facing lights are connected to watertight connectors 12 on the hub.

Referring to FIG. 6, an embodiment of the buoyant power hub system is shown featuring a retractable anchor line system. The underside of the floating housing 10 includes a built-in winding reel 40, preferably spring-loaded, that contains an anchor line 42. In this figure, the anchor line is shown deployed and attached at its distal end to an anchor 44 resting on the bottom of the body of water. This setup helps maintain the buoyant power hub in a fixed position during use. Also shown are two buoyant lighting accessories 30, each connected to the watertight electrical connectors 12 on the hub and each featuring downward-facing lighting elements 32 that provide underwater illumination.

In this embodiment, the spring-loaded reel 40 may include a stopping mechanism, which is commonly employed with such spring-loaded reels, and the stopping mechanism provides that the user can pull any desired length of anchor line 42 from the spring-loaded reel 40, and the spring-loaded reel 40 is temporarily prevented from rewinding and retracting the anchor line 40 until a user disengages the stopping mechanism. These types of spring-loaded reels with stopping mechanisms are commonly used for garden hose reels, pressure washer hose reels, electrical extension cord reels, and the like, and are widely commercially available in many forms, as will be recognized by those skilled in the art. In this embodiment, it is contemplated that the end of the anchor line 42 may be directly tied or otherwise attached to an anchor 44, or may simply be attached to a carabiner, clip or other attachment device that itself may be attached to an anchor 44. Further, it should be understood that the term anchor may include any weighted object that serves to maintain the buoyant power hub system in place to prevent the power hub system from drifting away during high winds or in rough water.

Alternatively, the buoyant power hub may include any other type of suitable anchoring mechanism, which may be as simple as an eyelet, or any other type of anchor point, preferably positioned on an underside thereof for temporarily receiving an anchor line and an anchor or weight, as desired. It should be understood that the anchor system described herein, including the spring-loaded winding reel or any other suitable anchor system may be used in conjunction with any embodiment of the buoyant power hub described herein.

b. Watertight Electrical Connector/Protective Covers

The buoyant power hub preferably includes a series of watertight electrical connectors 12 that essentially act as power outlets, which may be connected to watertight electrical cords 24 of various electrical accessories in a watertight manner. Any suitable type of watertight electrical connectors 12 may be used, and examples of such watertight connectors are shown and described in detail in U.S. Pat. Nos. 9,716,338 and 10,079,504, and US Patent Application Pub. No. 2022/0393389, which are hereby incorporated by reference, in their entireties. When not in use, each watertight electrical connector 12 preferably includes a watertight cap 16, plug or cover to prevent water from seeping into the electrical connector 12 when electrical connector is not operatively connected to a complementary electrical connector or accessory.

Electrical cords 24 having corresponding/complementary connectors 12 may be temporarily attached to these watertight electrical connectors on the power hub at one end, and may similarly be operatively connected to electrically powered accessories, such as floating decorative lighting accessories, for example. In some embodiments, the electrical cords 24 themselves may include lights, such as external and watertight rope lighting, for an enhanced aesthetic effect.

c. Photocell/Timer/Clock

The buoyant power hub may further include photocells that are operatively connected to the power source, so that power is only supplied to the watertight electrical connectors 12 at night, or when the ambient light level detected by the photocell is below a pre-determined level. A clock and/or timer may also be included in or on the buoyant power hub 10, which allows a user to program the electrical connectors, either collectively or individually, to activate and deactivate at certain times. So, for instance, a user may program the clock and/or timer to activate the electrical connectors 12 to turn on decorative lights at 8 PM every evening, and subsequently to deactivate at 12 AM, or to activate and deactivate at any time or for any desired time interval. It is contemplated that individual watertight electrical connectors 12 may be controlled independently to activate and deactivate at different times from one another.

d. Built-In Lights

Figure 5:
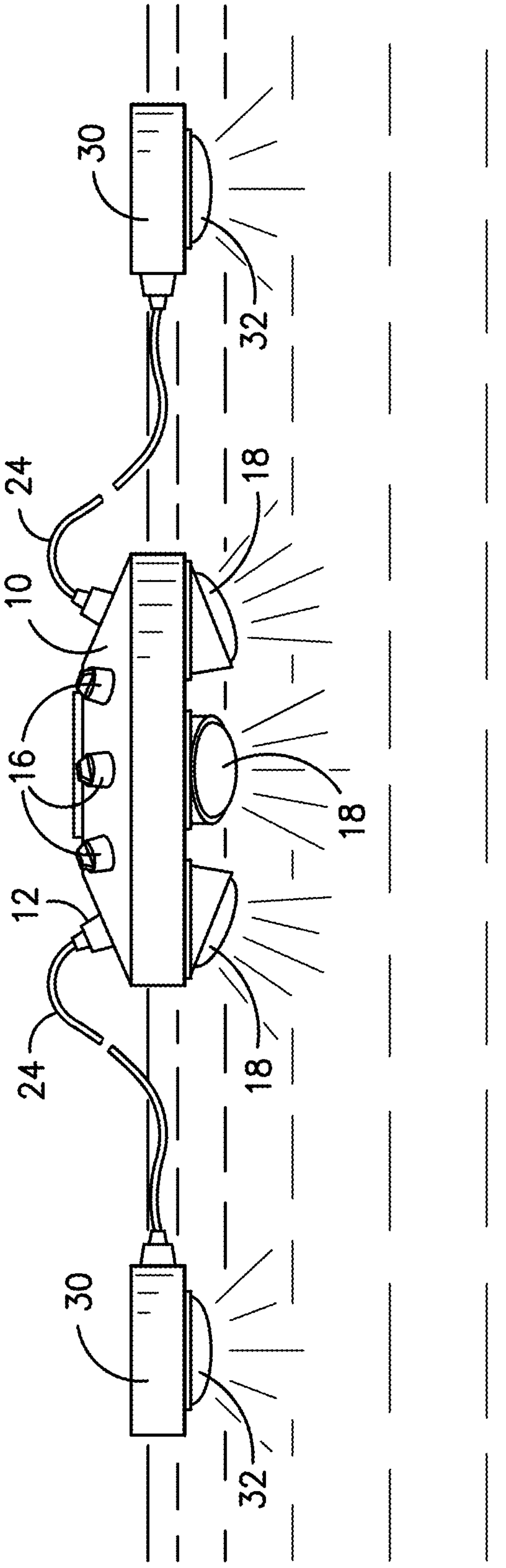
FIG. 5 is a side view of another embodiment of a buoyant power hub system floating on a body of water, showing a set of built-in lights on the underside of the housing, and a pair of buoyant lighting accessories connected to watertight connectors, wherein each accessory includes downward-facing lights to illuminate the water below.

In some embodiments, the buoyant power hub 10 may include one or more built-in lights 18 that are positioned thereon in any desired location. For example, some versions of the power hub 10 may include lighting 18 that is positioned on an underside thereof, so that the lights 18 are submerged and serve to illuminate the underwater area beneath the floating power hub, as shown in FIG. 5. Lighting 18 may also be positioned on the power hub in any other location or in any desired configuration. This lighting 18 may consist of single or multiple lights, light strips, laser lights or the like, and may include single colors, multiple colors, or may be programmed to change lighting schemes intermittently, as desired.

e. Fog/Mist Creating Component

In some embodiments, the buoyant power hub may include a fog creating component, also referred to herein as a fog machine 90. Fog creating machines for swimming pools, lakes and ponds are widely commercially available. In one embodiment of the present invention, a fog machine 90 is attached to the buoyant power hub, preferably so that the fog machine 90 is disposed slightly below the surface of the water, as shown in FIG. 11.

Figure 11:
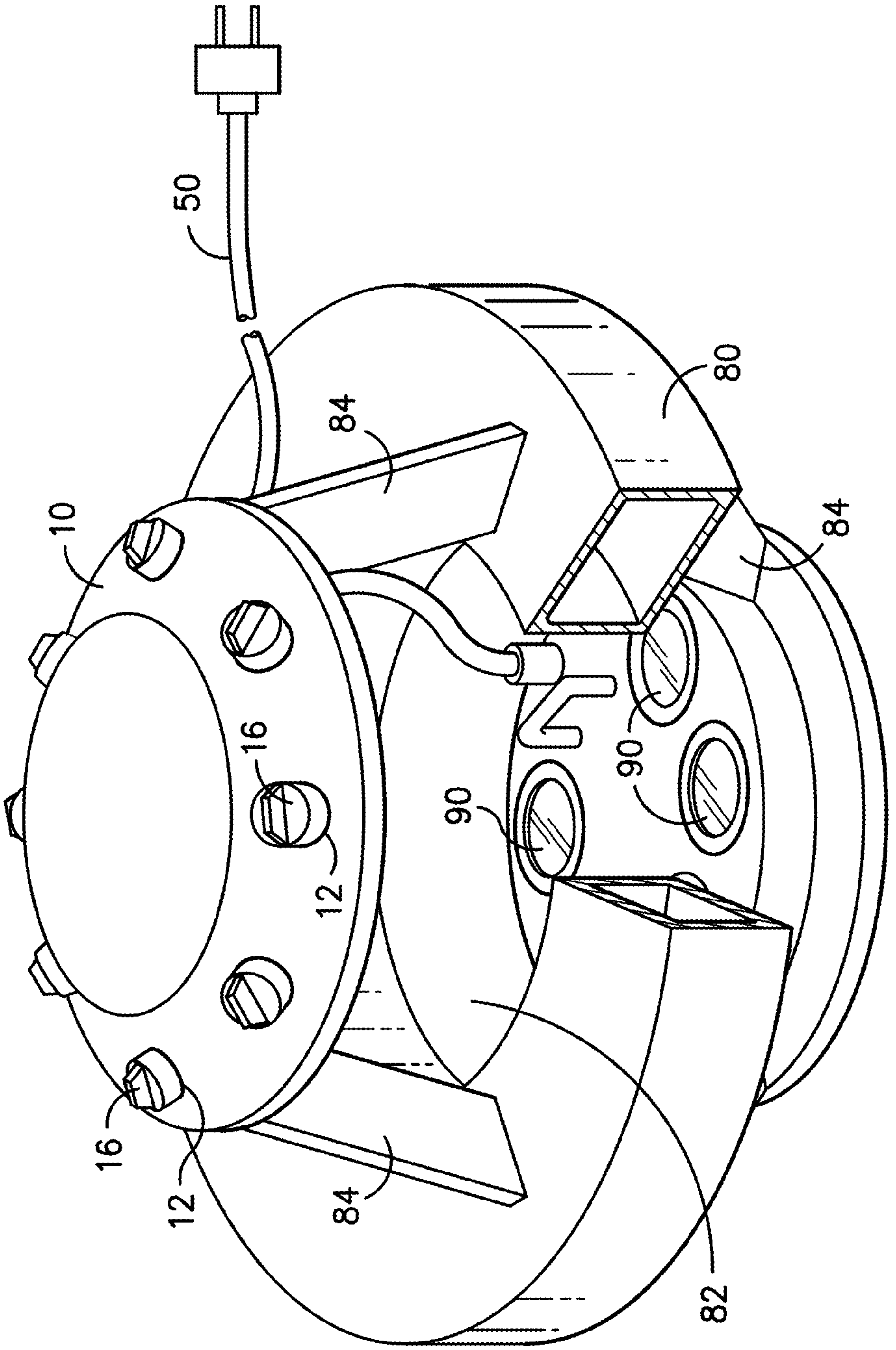
FIG. 11 is a perspective, partial cut-away view of another embodiment of the buoyant power hub system, including a circular buoyant member that defines a central hole. A power hub housing is positioned above the buoyant member and supported by a series of vertical support arms. The housing includes multiple watertight electrical connectors disposed on an upper surface. A fog machine is suspended below the circular buoyant member by support arms, and is operatively connected to the power hub via an electrical cord that supplies power to both the fog machine and the watertight connectors.

As illustrated in FIG. 11, the buoyant power hub system preferably includes a circular buoyant member 80 having a central opening 82. A raised power hub housing 10 is mounted above the buoyant member 80 via a plurality of support arms 84, and includes a series of watertight electrical connectors 12 disposed on its upper surface. A fog machine 90 is suspended beneath the buoyant member 80 by another set of support arms 84 that connect to the underside of the buoyant member 80. The fog machine 90 is operatively powered by the internal power source, which also powers additional connected accessories. This arrangement creates a central fog-emitting zone beneath the buoyant member 80, enabling dramatic lighting and atmospheric effects. In some embodiments, recessed strip lighting, or any other suitable lighting (not shown) may also be positioned on or near the fog machine 90 or along the inner edge or perimeter of the buoyant ring for enhanced visual impact.

The fog machine 90 is preferably centrally positioned with respect to the buoyant member 80 so that the fog created by the fog machine 90 rises to the surface of the water generally within the central opening 82 defined within the buoyant member 80. In a preferred embodiment, recessed lighting is disposed on a bottom portion of the raised power hub housing 10, which is slightly raised above the level of the water in this embodiment. This arrangement allows the buoyant power hub to create fog that generally surfaces within the central opening 82 defined within the buoyant member 80, wherein the fog is illuminated by the lighting from any or all of the above-referenced light sources.

f. Remote Control

Additionally, the buoyant power hub may be operated by any suitable type of remote control, including a dedicated remote control unit, or via an app on a smartphone, electronic tablet, or any other suitable device that may run a software application (an "app") to control the buoyant power hub system, including the fog machine 90, built-in accessories, such as lighting 18 and speaker(s), as well as operating other individual accessories, such as decorative lighting accessories 30, water fountain accessories, or any other accessories that are operatively connected to the buoyant power hub. In some embodiments, the remote control may individually and separately activate or deactivate specific watertight electrical connectors 12, or all electrical connectors 12 at the same time. The remote control may also operate all lighting features (built-in lighting 18, buoyant lighting accessories 30 and 32, and submerged lighting 60), including colors, color schemes, brightness, and the like. Additionally, the remote control may also be used to operate and program the clock and/or timer functions of the power points, either individually or collectively. Essentially, the remote control may control any or all functionality of the buoyant power hub, in all embodiments described herein.

As is well known in the art, the buoyant power hub may include a transmitter/receiver to communicate with the remote control wirelessly through any suitable wireless communication protocols, including Wi-Fi, Bluetooth, infrared communications, or the like, in order to communicate with one or more remote control units or other wirelessly connected accessories. If one or more speakers are connected to the buoyant power hub (either as built-in components, or as accessories attached to power points), the speakers are configured to play music or other audio content that may be controlled by the remote control (including music selection, volume, mute, and other commonly known functionality associated with wireless control of speakers and music systems).

g. Solar/AC Power

As previously mentioned, the buoyant power hub serves primarily as a power source for powering various functions and components that form part of the power hub itself, as well as providing electrical power to lighting and accessories that are operatively connected to the power points.

Accordingly, the power hub 10 may include a solar cell or panel 14 mounted thereon, which is preferably operatively connected to one or more rechargeable batteries housed within a watertight compartment within the power hub. In this embodiment, the on-board batteries are used to provide power to the watertight electrical connectors, and thus, to any attached accessories, as well as providing power to any other on-board electrical components, such as the built-in lights. In a preferred embodiment, the rechargeable batteries are housed within the power hub within an accessible, watertight compartment, and are easily accessible to a user, so that the rechargeable batteries may be removed and replaced, as necessary. Preferably, the rechargeable batteries may be accessed through a watertight hatch that may be secured into a closed position in a watertight manner, and wherein the hatch may be temporarily opened when battery replacement is necessary.

Figure 7:
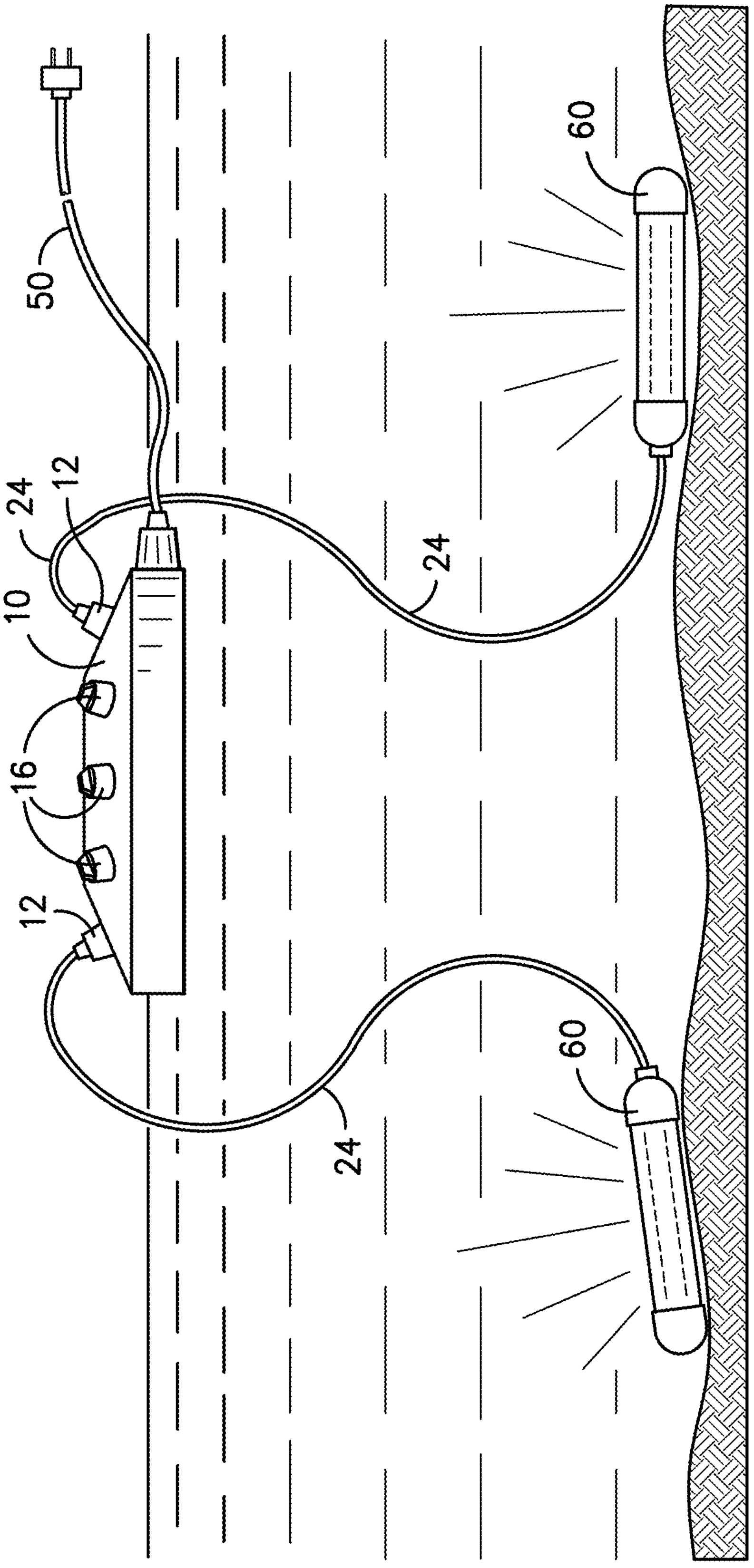
FIG. 7 is a side view of another embodiment of the buoyant power hub system floating on a body of water, including a watertight power cord extending from the housing 10 to a standard electrical outlet. A pair of submerged underwater lights are positioned on the bottom surface of the water body and are electrically connected to the power hub via electrical cords attached to watertight electrical connectors.

In other embodiments, the buoyant power hub may include a standard, watertight electrical cord 50 having a standard plug that may be plugged into any standard electrical outlet, which provides constant power to the power hub and all attached accessories. For example, as shown in FIG. 7, another embodiment of the buoyant power hub system is depicted in which the housing 10 is connected to a standard external power source via a watertight AC power cord 50 plugged into an electrical outlet. In this embodiment, a pair of underwater lights 60 are positioned on the bottom of the body of water. These lights are electrically connected to the watertight connectors 12 on the hub using underwater-rated electrical cords 24. This configuration allows the buoyant power hub to serve as a floating power delivery platform even in scenarios where solar charging may be insufficient, enabling continuous illumination of submerged lighting accessories.

It should be understood that the buoyant power hub may be powered either by a solar panel operatively attached to a rechargeable battery that is preferably positioned within the housing in a watertight compartment, or it may be powered via an electrical cord that is plugged into any type of electrical outlet, and either type of power source may be used for any embodiment described herein.

III. Decorative Lighting Accessories

Figure 4:
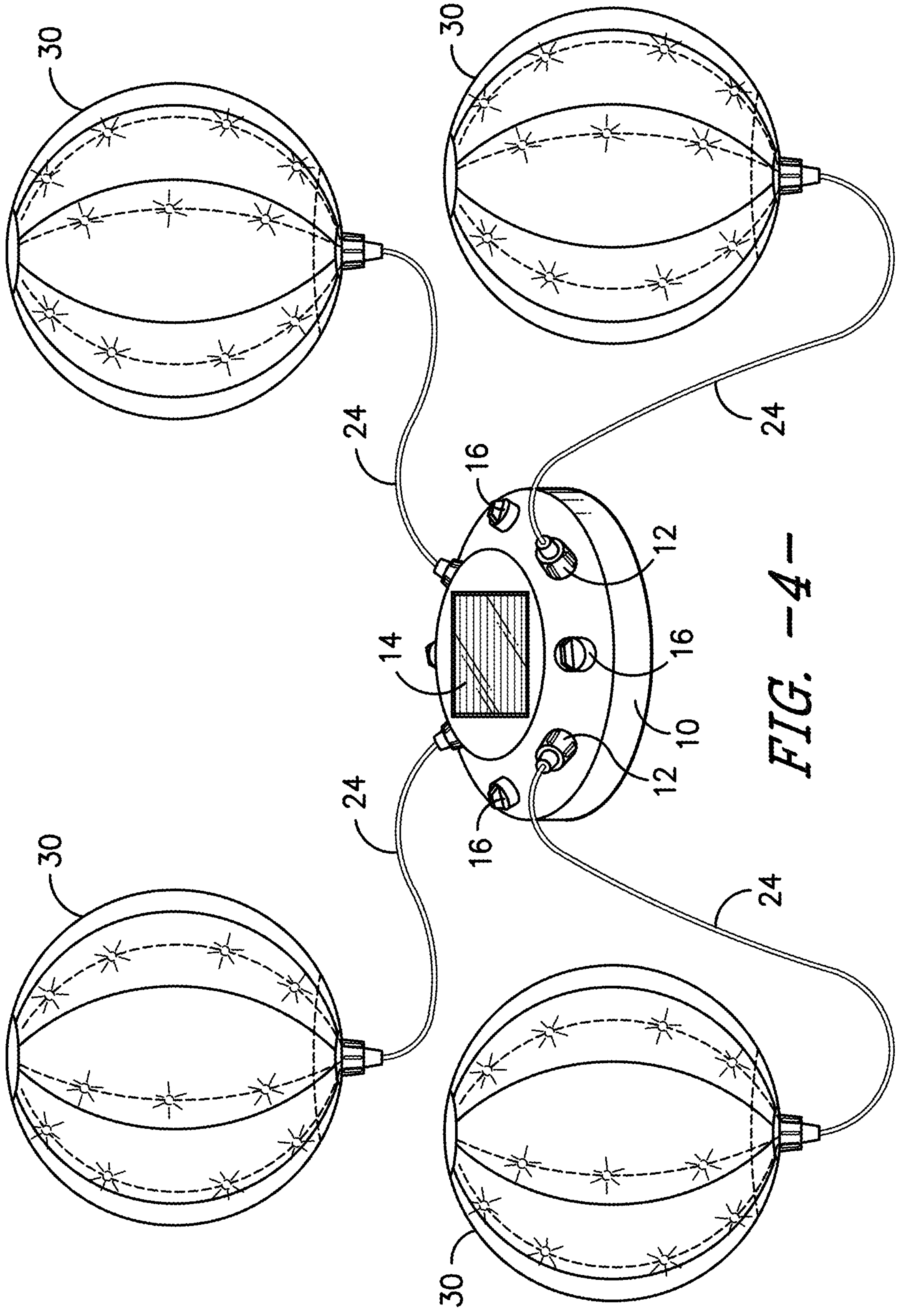
FIG. 4 is a perspective view of one embodiment of a buoyant power hub system with multiple buoyant lighting accessories operatively connected to the watertight electrical connectors, and further showing a solar panel mounted on an upper surface for charging rechargeable batteries housed in a watertight internal compartment.

Referring now to FIG. 4, the buoyant power hub 10 is shown with several buoyant lighting accessories 30 connected to the watertight electrical connectors 12 via electrical cords 24. The accessories 30 may include LED-based decorative floats configured to receive power from the hub. In some embodiments, a solar panel 14 disposed on the top surface of the housing 10 is operatively connected to rechargeable batteries contained within a watertight compartment inside the hub. This configuration enables the system to store energy during daylight hours for use at night and further demonstrates its capacity to support multiple illuminated floating accessories simultaneously.

Decorative lighting accessories may take any suitable form, and may be buoyant or non-buoyant, as desired. In some applications, as discussed previously, the decorative lighting accessories may include holiday-themed lighting for holiday or seasonal use. For example, Halloween-themed lighting may include buoyant, lighted pumpkins, ghosts, goblins, or the like.

Other types of floating light accessories may be used, such as lights that are directed downwardly into the water, or fixed or adjustable lights that may be directed in any desired direction (such as floating lighting that is directed toward a boat to illuminate it at night, for example).

a. Daisy Chain Accessory System

It is contemplated that the present system may also include lighting and other decorative lighting accessories that may be electrically and operatively connected to the power hub in a daisy-chain configuration, where a first accessory is connected to the power hub, and a second accessory is connected to the first accessory, and so on, so that all daisy-chained accessories are powered by the buoyant power hub.

Figure 8:
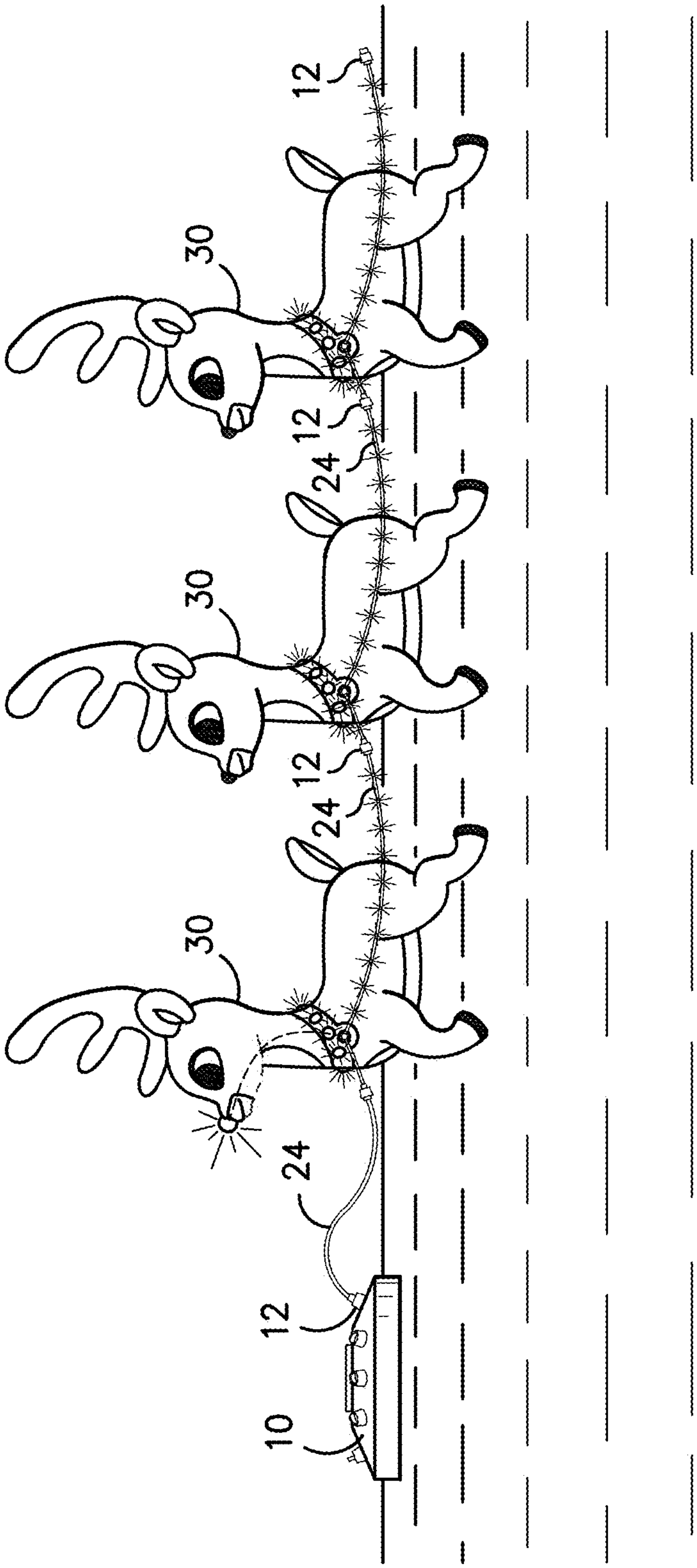
FIG. 8 is a side view of one embodiment of the buoyant power hub system floating on a body of water, showing a series of buoyant lighting accessories in the shape of reindeer connected in a daisy-chain configuration. Each reindeer includes a front watertight electrical connector and a rear watertight electrical connector, enabling sequential power connections between adjacent units, all powered from the buoyant power hub

Referring now to FIG. 8, one embodiment of a daisy-chain decorative lighting system is shown. A series of buoyant lighting accessories 30 in the shape of reindeer are connected in sequence to the buoyant power hub 10 via electrical cords 24. In some embodiments, each reindeer lighting accessory 30 includes two watertight electrical connectors 12—one located on a front portion and another on a rear portion thereof. The front electrical connector 12 receives power from either the power hub 10 or the preceding accessory 30 in the chain, while the rear electrical connector 12 passes power along to the next reindeer. This arrangement allows the entire sequence of lighted reindeer to be powered in a chained manner from a single connector on the buoyant power hub. This embodiment is especially useful for holiday-themed lighting arrangements, where the accessories are intended to be positioned in a floating linear array on a body of water.

Figure 9:
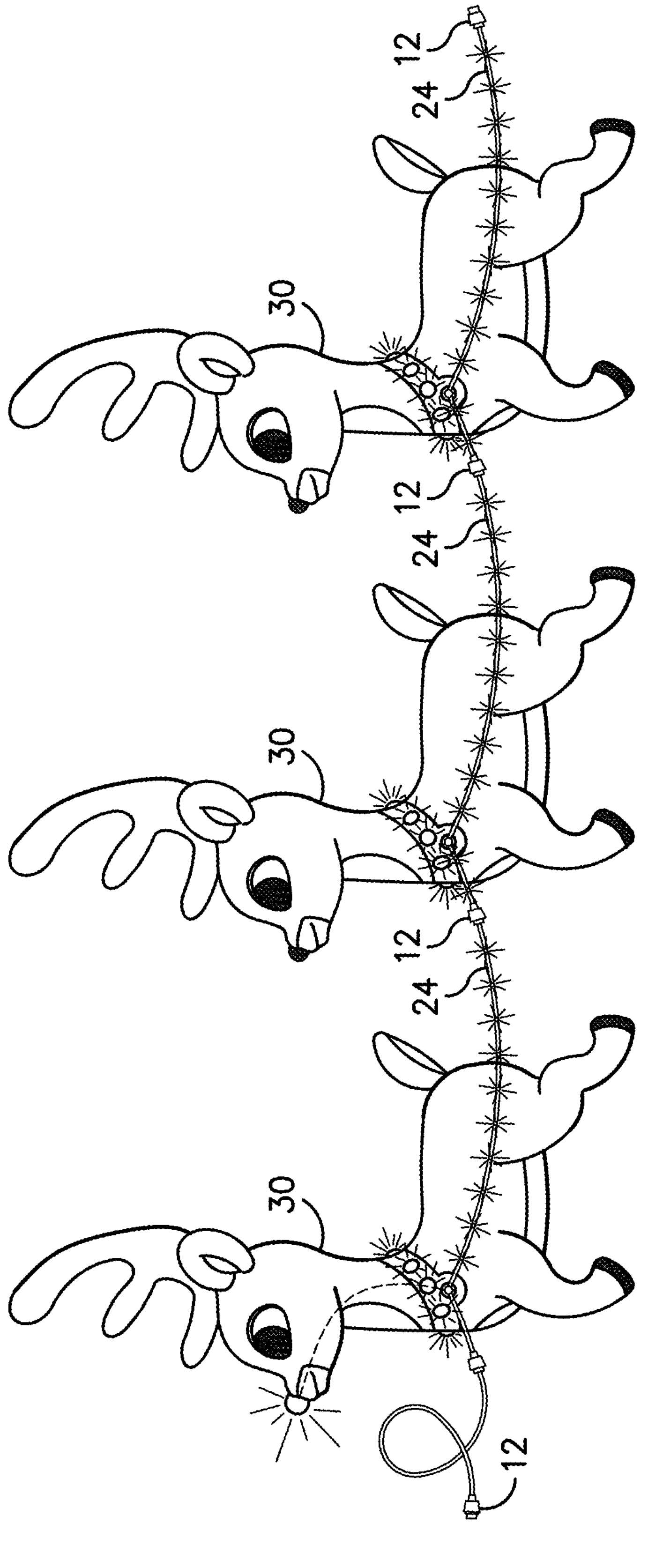
FIG. 9 is a side view of a series of floating decorative lighting accessories in the shape of reindeer, connected in a sequential daisy-chain configuration via electrical cords. Each reindeer includes a pair of watertight electrical connectors—one on the front and one on the rear—allowing each accessory to be linked to adjacent units in the chain.

As shown in FIG. 9, a series of decorative lighting accessories in the form of floating reindeer are connected in a linear, daisy-chain configuration. Each reindeer is connected to the next via an electrical cord 24 having watertight connectors 12 at both ends. These cords are used to attach the front connector of one reindeer to the rear connector of the preceding reindeer, enabling a sequential power connection from the buoyant power hub through the entire chain. This figure illustrates a modular, scalable approach to festive lighting, allowing multiple lighted units to be powered by a single source and arranged flexibly on the surface of a body of water.

Other types of lighting accessories may be non-buoyant, so that they extend downwardly below the surface of the water and operate as underwater lights 60. Such lighting may include underwater rope lighting, or lights that rest on the bottom of the pool, lake or pond, or lights that are simply suspended between the floating power hub and the bottom.

b. Power Cord Connections/Rope Lights

In some embodiments, the electrical cords 24 used to connect the power hub 10 to the attachable accessories, and also the electrical cords 24 that connect one accessory to the other in a daisy-chain fashion, may themselves include lighting incorporated into the electrical cord, as shown in FIGS. 8-9. For example it is contemplated that rope lighting may be used to connect the power hub to accessories, or may extend between accessories in a daisy-chain manner, which not only serves to illuminate the electrical cords themselves, but also powers the various attached accessories. In the Santa sleigh/reindeer example described above, each reindeer and the sleigh may all be connected to and powered by rope lighting, for example, as shown.

IV. Fishing Embodiments

In some embodiments, it is contemplated that the buoyant power hub 10 may be used for night fishing purposes. It is well known that fish are attracted to light, and many types of floating lights 32 and underwater lights 60 are currently marketed for purposes of attracting fish for night fishing activities. Various embodiments are particularly suitable for night fishing activities, and are shown in FIGS. 5-7.

Referring now to FIG. 5, an alternative embodiment of the buoyant power hub system is shown in side view, with the housing 10 floating on a body of water. A plurality of lights 18 are affixed to an underside of the housing 10 to provide downward illumination beneath the hub. In this embodiment, two buoyant lighting accessories 30 are shown connected to the watertight electrical connectors 12 via cords 24. Each of the lighting accessories 30 includes one or more lights 32 that are oriented to direct light downwardly into the water, which is especially useful for ambiance, underwater visibility, or fish-attracting applications.

FIG. 6 illustrates an embodiment of the buoyant power hub system is shown featuring a retractable anchor line system, as well as two buoyant lighting accessories 30, each connected to the watertight electrical connectors 12 on the hub and each featuring downward-facing lighting elements 32 that provide underwater illumination. The underside of the floating housing 10 in this embodiment includes a built-in winding reel 40, preferably spring-loaded, that contains an anchor line 42. In this figure, the anchor line is shown deployed and attached at its distal end to an anchor 44 resting on the bottom of the body of water. This setup helps maintain the buoyant power hub in a fixed position during use.

The embodiment shown in FIG. 7 shows submerged lights 60 that may be incorporated into this embodiment, as the submerged lights 60 are most useful for attracting fish. It is contemplated that the buoyant power hub 10, as used in a fishing embodiment, may include built-in lights 18 on an underside of the housing (including any type of lighting, such as recessed lighting, LED lighting, rope or strip lighting, etc.), and may include both floating lights 32 directed downwardly into the water, as well as submerged lighting 60, which may extend all the way to the bottom of the body of water as shown in FIG. 7, or which may simply be submerged below the buoyant power hub and suspended above the bottom.

In this embodiment, the floating power hub 10 itself preferably include lights 18 on an underside thereof that point downwardly or otherwise provide illumination that is directed downwardly into the water. Buoyant lighting accessories 32 may also be attached to the watertight electrical connections 12 on the power hub 10 to provide additional lighting, including floodlights having a buoyant housing (such as Styrofoam or cork, for example) that are directed downwardly into the water, as shown. Watertight rope lighting (either buoyant or non-buoyant) may be used for this purpose, as well, or may be used to connect the power hub to buoyant or non-buoyant lighting accessories, as well. It should be understood that all accessories may be interchanged and operatively connected to the power hub, including the buoyant lights, the submerged lights, the anchor system, and any other component described herein.

V. Toy Accessories

Other types of accessories may also be connected to the buoyant power hub, as desired. In one embodiment, electrically powered water guns may be operatively connected to the power hub. Electrically powered water guns are widely commercially available today. Most of these water guns are battery powered, which means that either the batteries need to be replaced frequently, or the batteries must be recharged on a regular basis. Additionally, current models of electrically powered water guns must be constantly reloaded with water.

In the present invention, the water guns may include or be operatively connected to a power cord that is attached to a power point on the buoyant power hub, which eliminates the need to recharge the water gun batteries. Additionally, in a preferred embodiment, each water gun may include a water tube that feeds directly into the water gun, wherein the free end of the water tube extends downwardly from the water gun into the water, so that water may be consistently fed into the gun. This arrangement allows a water gun to fire continuously without having to reload or refill an internal water reservoir to provide ammunition therefor.

Figure 10:
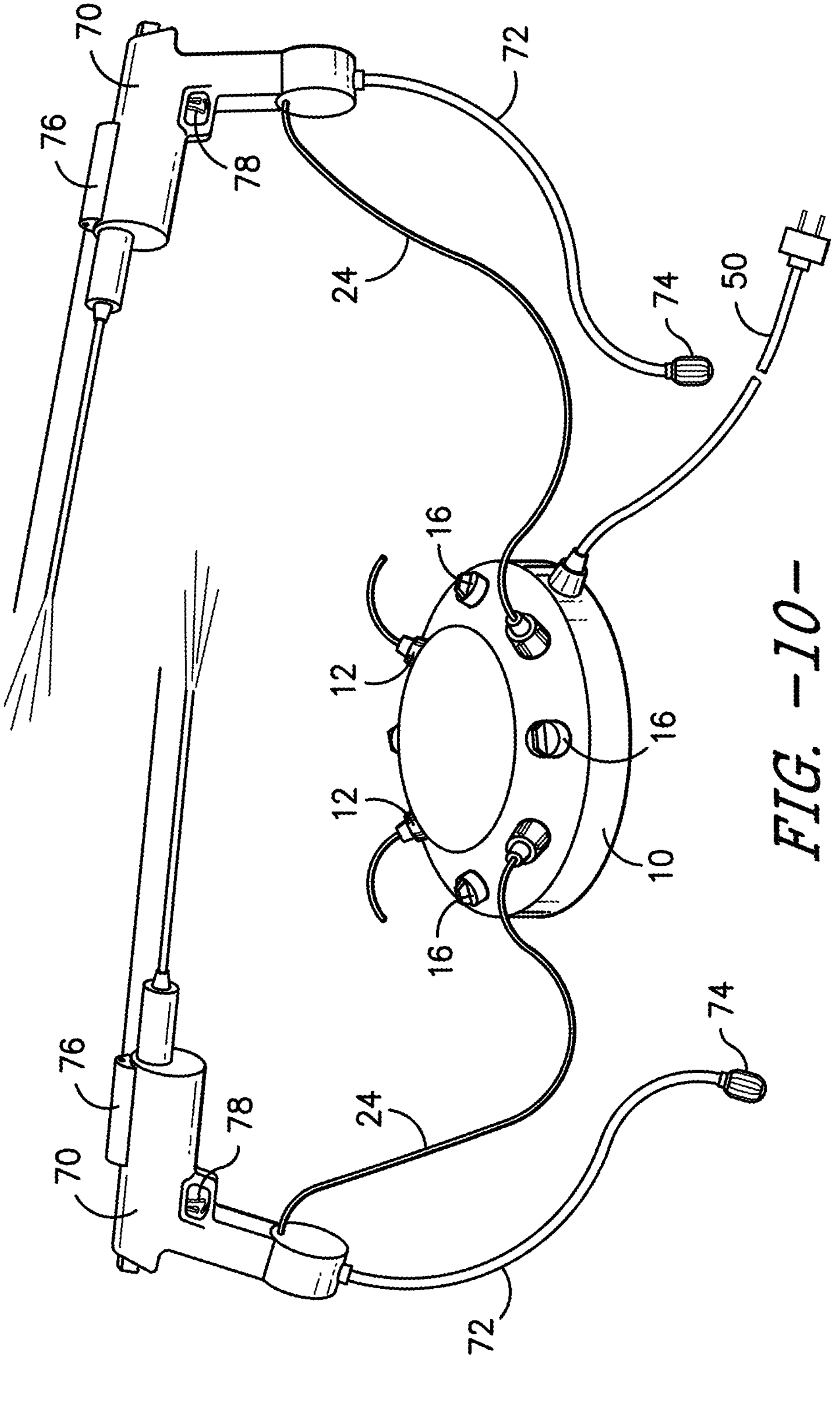
FIG. 10 is a perspective view of one embodiment of the buoyant power hub system, showing a series of watertight electrical connectors disposed on an upper portion of the hub. A pair of water guns are operatively connected to the hub via electrical cords attached to the watertight connectors. Each water gun includes a water intake hose with a filter at its distal end for drawing water from the surrounding environment, and a light that is activated upon pulling the trigger of the water gun.

Referring now to FIG. 10, the buoyant power hub 10 is shown in perspective view with a pair of electrically powered water guns 70 connected to the watertight connectors 12 via electrical cords 24. Each water gun includes a flexible water hose 72 extending downwardly into the body of water. A filter 74 is disposed at the distal end of each hose to prevent debris from entering the water supply line. The hose 72 draws water directly from the surrounding environment to serve as ammunition for the water gun 70, allowing for continuous use without manual refilling. Additionally, in a preferred embodiment, each water gun 70 is equipped with a light 76, which is activated when the trigger 78 is pulled, producing a pulse of light synchronized with the water stream fired from the water gun 70. This configuration enhances playability, especially when combined with fog or mist-producing features from the power hub, as the light beams become visible in the mist.

Additionally, although this invention has been described in some embodiments wherein the fog machine 90 forms a part of the buoyant power hub, in some embodiments, fog machine 90 may instead function as a buoyant accessory that is attached to the watertight electrical connectors 12 of the power hub 10.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A buoyant power hub system comprising:

a buoyant housing configured to float on a body of water;

a power source disposed within the housing, the power source comprising at least one of: (i) a solar panel operatively connected to rechargeable batteries, or (ii) a watertight AC power input cord;

a plurality of watertight electrical connectors disposed on the housing;

a fog or mist generating unit mounted below or adjacent the housing; and at least one lighting element directed to illuminate fog produced by the fog or mist generating unit, wherein the watertight electrical connectors include protective covers to prevent water ingress when not in use.

2. The buoyant power hub system of claim 1, further comprising an anchor system, the anchor system comprising:

a spring-loaded reel disposed within a waterproof compartment in the housing; and an anchor line attached to the reel and extendable to secure the housing in place on a body of water.

3. The system of claim 2, wherein the anchor line attached to the reel comprises a locking mechanism with selectable anchor line length presets.

4. The buoyant power hub system of claim 1, further comprising:

at least one accessory configured for connection to, and receipt of, power from the power source;

a photocell operatively connected to the power source and configured to actuate the delivery of power to the at least one accessory connected to the power source based on ambient light levels.

5. The buoyant power hub system of claim 4, further comprising:

a timer and/or programmable clock operatively connected to control the timing of power delivery to the watertight electrical connectors.

6. The buoyant power hub system of claim 5, further comprising:

a wireless remote control interface for activating or deactivating the watertight electrical connectors, adjusting lighting characteristics, or managing timer/programmable clock functions.

7. The buoyant power hub system of claim 1, further comprising an external accessory comprising a buoyant or non-buoyant lighting device;

wherein:

the lighting device comprises an electrical cord having a watertight electrical connector compatible with the hub's watertight electrical connector, and multiple lighting devices are connectable in a daisy-chain configuration.

8. The buoyant power hub system of claim 7, wherein the daisy-chain configuration comprises:

a decorative lighting arrangement having a first lighting accessory with both front and rear watertight connectors; and additional lighting accessories sequentially connected to the first accessory via the watertight electrical connectors.

9. The system of claim 6, wherein the lighting devices connected in the daisy-chain configuration comprise a decorative float shaped as a holiday character selected from a group consisting of: reindeer; sleighs; jack-o'-lanterns; ghosts; and aquatic animals.

10. The buoyant power hub system of claim 1, further comprising:

one or more built-in lighting elements mounted on the housing, wherein the lighting elements are configured to illuminate areas above or below the water surface.

11. The buoyant power hub system of claim 1, wherein the power source, the watertight electrical connectors, and the accessories are configured for operation in recreational applications including decorative lighting, games, water toys, music playback, or fishing.

12. The system of claim 1, wherein the watertight electrical connectors;

are rated for underwater submersion, and comprise threaded locking collars to secure electrical cords in place.

13. The system of claim 1, wherein:

the buoyant housing comprises an annular float defining a central aperture, and the fog or mist generating unit is suspended below the aperture.

14. The system of claim 1, further comprising a light sensor and control circuitry configured to modulate power output to individual ones of the watertight electrical connectors based on ambient light level and time of day.

15. The system of claim 1, wherein the housing further comprises at least one onboard speaker configured to receive wireless audio input from a mobile device.

16. A buoyant power hub system configured to receive control signals from a remote control, the buoyant power hub system comprising:

a buoyant housing;

a power source in the housing;

a plurality of watertight electrical connectors on the housing;

a fog or mist generating unit mounted below or adjacent the housing;

at least one lighting element directed to illuminate fog produced by the fog or mist generating unit; and a wireless communication module configured to:

receive control signals from the remote control; and selectively activate individual watertight electrical connectors based on received signals.

17. The system of claim 16, further comprising accessories operatively and interchangeably connected to and powered by the watertight electrical connectors, wherein the accessories are selected from the group consisting of; lighting; a fogging machine; a music speaker; and an electrically powered water gun.

18. The system of claim 16, wherein the control signals comprise instructions for activating and deactivating individual watertight electrical connectors and adjusting brightness, color, lighting sequences of connected lighting elements.

19. The system of claim 16, further comprising an anchor system attached to the buoyant housing, the anchor system comprising:

a spring-loaded reel disposed within a waterproof compartment in the housing; and an anchor line attached to the reel and extendable to secure the housing in place on a body of water.

* * * * *